Patented Oct. 17, 1933

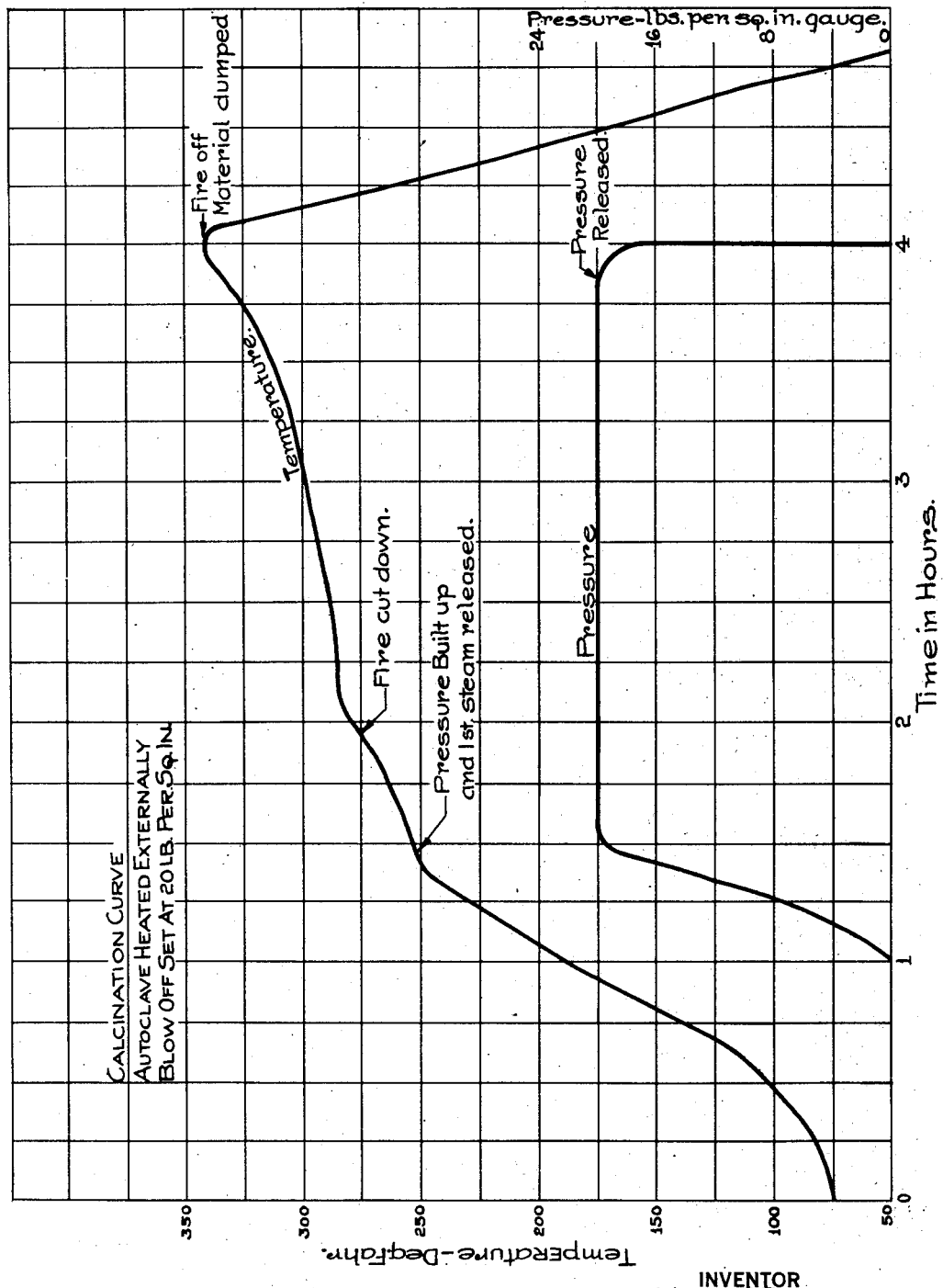

1,931,240

UNITED STATES PATENT OFFICE 1,931,240

PROCESS OF CALCINING GYPSUM

Wilbur S. Randel and Manvel C. Dailey, Chicago, Ill., assignors to United States Gypsum Company, Chicago, Ill., a corporation of Illinois Application February 7, 1930. Serial No. 426,470

3 Claims. (Cl. 23—122)

This invention relates to a process or method of calcining gypsum, and has reference more particularly to a method of the class described in which the gypsum is calcined under pressure.

In the manufacture of plaster-of-Paris or other types of calcined gypsum, it is customary to grind up the gypsum rock to a powder and introduce this powder into large open kettles which are heated externally and also are heated by means of internal fire tubes passing through the kettle. The powder is agitated while it is heated, and the heating causes steam to be produced as a result of the partial dehydration of the gypsum. The steam evolved from the gypsum passes upwardly through the mass of powdered gypsum, causing same to have the appearance of boiling. The results obtained by ordinary kettle calcination are not uniform and the product is apt to vary in strength and in composition. Ordinary first settle stucco is composed of a mixture chiefly of calcium sulphate hemihydrate and soluble anhydrite with hemihydrate predominating. It is practically impossible to produce pure hemihydrate by the kettle process of calcination. Furthermore, the strength of the resulting product is comparatively low and does not place it in the field of use comparable to that of Portland cement and certain other cementitious materials.

In our copending application, Serial No. 384,343, filed August 8, 1929, now Patent 1,901,051, we have described a method of pressure calcination in a closed container in which the heating is accomplished by means of steam applied internally in the container in direct contact with the gypsum. A pressure of about 17 pounds per square inch gauge is maintained on the steam for a calcination period of five to seven hours, condensed water being removed from the container or calciner from time to time during the calcination period. After the end of the calcination, the pressure is released, and the material then consists of substantially pure calcium sulphate hemihydrate which contains from 10% to 15% of uncombined or free water which is removed by drying by external heating under atmospheric pressure in any suitable dryer. One precaution which must be carefully observed in this type of process is that the calcined material while in the damp state must be maintained at a temperature of not less than 212° F. in order to prevent rehydration to calcium sulphate dihydrate which takes place below this temperature. However, by this process, heretofore described by us, a product was produced after drying which, when suitably reduced by fine grinding, has a normal pouring consistency of approximately 45 cc.'s, a tensile strength at 45 cc. consistency of about 700 pounds per square inch and a compressive strength of about 5,000 pounds per square inch. Thus, this product possesses unique properties in that it sets to a cast of extremely high strength, this strength being in the range of Portland cement or higher, and much higher than has heretofore been obtained with any calcium sulphate hemihydrate product, being equal to, or better than Keene's cement in strength. It has the additional advantage that it sets up to a hard cast in 15 to 25 minutes whereas Keene's cement and Portland cement require 6 to 8 hours for setting, and even then the final strength is not attained for a matter of several days.

In the present invention, we have discovered that a product having the same superior properties can be produced by a somewhat different method of manufacture. With our improved manufacturing process, the material is produced in a completely dry condition, so that no subsequent during operation is necessary. The material may, therefore, be cooled down completely immediately after calcination with no danger of rehydration to the dihydrate form.

An object of this invention, therefore, is to provide a method of calcining gypsum in which a high-strength product is produced, said product having a very low consistency.

Another object of the invention is to provide an improved manufacturing method in which no subsequent drying operation is necessary, and the material can be cooled down immediately after calcination without danger of rehydration to the dihydrate form; also to improve calcination methods in other respects hereinafter specified and claimed.

Reference is to be had to the accompanying drawing forming a part of this specification in which the figure is a graphical illustration of the method of carrying out our improved calcination method.

In this method, gypsum rock ranging from pieces 1/8" to 2" in diameter, is preferably charged into a horizontal cylinder capable of rotation. This cylinder is in effect an autoclave capable of withstanding the low internal pressures required in our improved process. The autoclave is preferably mounted for rotation inside of a furnace, heating means being provided for heating the cylinder externally. The steam and other vapors produced by the calcination are withdrawn through the axis of rotation of the cylinder. After the rock is charged into the cylinder, through a door therein, the door is closed and the heat applied to the cylinder as the latter is slowly rotated to prevent localized overheating and to give a faster heat transfer to the material contained in the cylinder. Attached to the outlet pipe for the steam leading from the cylinder, is a blowoff valve which is set to relieve the pressure when said pressure exceeds 17 to 20 pounds per square inch gauge. As the material in the cylinder is heated up, a pressure is built up within the cylinder, partially caused by the steam from the free water contained in the gypsum rock, and also from the combined water in the gypsum rock. The free water starts to vaporize at a temperature of 212° F. whereas the combined water does not start to vaporize until a higher temperature of 225 to 250° F. is reached. In the calcination of gypsum, by this process, for every 100 pounds of gypsum charged into the cylinder, approximately 15 pounds of water must be removed as steam.

The accompanying graphical chart shows in detail the preferred manner of carrying out our improved manufacturing process. The gypsum rock is charged into the cylinder at a temperature of approximately 75° F. and external heating of the cylinder is started while said cylinder is slowly rotated. When the temperature reaches 212° F. pressure is developed in the cylinder until a pressure of, say 20 pounds per square inch is reached, at which the blowoff gauge may be set to release the excess steam. The pressure is maintained substantially constant by means of the blowoff valve during most of the calcination period, and the steam escaping is replaced by additional combined water vaporizing from the gypsum as a result of the externally applied heat. This condition of continuous heating and expulsion of steam at 20 pounds per square inch pressure is carried on until the required amount of water of crystallization is liberated, at which time a decrease in the amount of steam being liberated is noted. During the period of calcination, the temperature of the material rises slowly due to the fact that a condition of superheat is being attained in the material so that when the calcination is completed, the temperature of the material has risen to 330-350° F. When this final temperature is reached, the pressure is reduced to atmospheric pressure by opening the steam outlet valve completely and the material is dumped from the cylinder in a calcined and dry condition. At this final temperature, any slight traces of free moisture remaining in the material are quickly evaporated due to the release of pressure at the completion of the calcination so that a completely dry product results.

In applying the heat to the cylinder during calcination, the temperature is brought up quickly to a point where the free water is completely evaporated and the liberation of the combined water commences. During this initial heating period, live steam may be introduced into the cylinder to hasten the temperature rise and produce a water-saturated condition in the gypsum at the start. This procedure appears to benefit the material slightly as to strength. The fire is then cut down in order to prevent too rapid liberation of the combined water, and also to prevent too rapid a crystallization of the gypsum to the hemihydrate form and thus insure the formation of crystals of the proper size and shape. During this initial calcination period, the temperature in the cylinder is maintained in the range of 275 to 300° F. until the calcination is nearly complete. The fire is then increased in order to bring the material up to the dumping temperature of 330° F. at which point the pressure is released, and the material dumped as heretofore described.

It should be understood that the graphical illustration represents but one set of conditions which may be used for carrying out our improved process, but these temperature, pressure and other conditions may vary considerably with the type of equipment used in the calcination of the gypsum. For example, instead of rotating the container, the latter may be held stationary and suitable internal agitating devices used to prevent localized overheating. It is also evident that the temperature and pressure conditions may be varied considerably to suit the type of apparatus used, and to produce a product which has the desirable qualities above noted.

The material discharged from the autoclave is very similar in appearance to the material charged into the autoclave, and consists of lumps of material from ⅛" to 2" in size. It is necessary to fine grind the material, preferably so that it all will pass a 40 mesh screen and approximately 95% will pass a standard 100 mesh screen. However, the grinding of the resulting product may be varied so that 88 to 98% of the product passes a 100 mesh screen with satisfactory results. Ball milling or tube milling may be used to advantage to accomplish this grinding. Under the conditions of calcination and grinding above described, we have found that the resulting product is almost entirely calcium sulphate hemihydrate in crystalline form and has the following properties:

| | |
|---|---|
| Consistency | 43-50 cc. |
| Time of set | 20 to 30 minutes |
| Wet weight of cast at normal consistency | 103 to 110 lbs. per cu. ft. |
| Dry weight of cast at normal consistency | 80 to 90 lbs. per cu. ft. |
| Tensile strength | 500 to 700 lbs. per sq. in. |
| Compressive strength | 3500 to 5000 lbs. per sq. in. |

The strength of the product increases slightly as the time of calcination is increased, up to about five hours. However, for economical manufacture, it is desirable to keep the calcination period down to about two and a half hours, although this may be varied considerably. Since the properties of the calcined product depend upon the production of a calcium sulphate hemihydrate of definite crystalline characteristics, such as that illustrated in the photomicrographs in our copending application, it is obvious that the process should be so regulated that the temperature of the material at discharge point should be such as to insure the complete formation of calcium sulphate hemihydrate in the crystalline state, and substantially none of the completely dehydrated calcium sulphate, or of soluble anhydrite as it is sometimes called. We have found that the formation of the soluble anhydrite may be prevented at temperatures above 330 to 350° F. by merely increasing the pressure at which the steam is blown off. For instance, we have found that at a release pressure of 100 pounds gauge, the temperature within the autoclave may be raised to 425° F. with no formation of anhydrite. However, at these higher pressures of calcination, while the product is still crystalline calcium sulphate hemihydrate, it exhibits properties at variance with the material calcined at lower pressure, in that it is of higher consistency, and the casts have a lower strength. In examining the crystals of the material formed at 20 pounds per square inch pressure, it is noted that they are short, thick and well formed as described in our copending application. At higher calcination pressures, the material is in the form of long, thin needle-like crystals which are fibrous in character.

It is thus seen that the control of pressure is highly important and should be so regulated that the product formed is of crystalline characteristics substantially as described for the production of the highest strength product. This preferred calcination pressure ranges from 17 to 50 pounds per square inch gauge, but may be varied somewhat without too great a sacrifice in strength of the resulting casts. We recommend the use of lumps of gypsum for calcination having a diameter of ⅛" to 2" and have found that if the gypsum is ground much finer than ⅛" in diameter before being charged into the calciner, the resulting calcined product does not have as high a strength as desired. For instance, material screening 75% through the 100 mesh screen before calcination gave a compressive strength of the resulting cast of only 3000 pounds per square inch. If the lumps of gypsum are larger than 2" in diameter, a decrease in efficiency of heat transfer is experienced. The combined water of the gypsum may be liberated from the autoclave in the form of liquid water, saturated steam or superheated steam, depending upon the conditions of temperature and pressure.

The product produced by our improved calcination process is completely dry when it is dumped from the calciner and may be cooled down immediately without danger of rehydration to the dihydrate form. It is ground to a product which sets to a cast of extremely high strength, the strength being in the range of Portland cement or higher, and much higher than has heretofore been obtained with any calcium sulphate hemihydrate product. The strength is equal to, or better than Keene's cement and the product has the added advantage that it sets up to a hard cast in 15 to 25 minutes, whereas Keene's cement and Portland cement require 6 to 8 hours for the initial set and several days for the final set.

In speaking of "consistency" in the above specification, the normal pouring consistency is meant, which is defined as that amount of water in cubic centimeters or grams, which, when mixed with 100 grams of dry, calcined gypsum, will produce a mix of such consistency that it will pour from a cup.

We would state in conclusion that while the illustrated examples constitute practical embodiments of our invention, we do not wish to limit ourselves precisely to these details, since manifestly the same may be considerably varied without departing from the spirit of the invention as defined in the appended claims.

Having thus described our invention, we claim as new and desire to secure by Letters Patent:

1. The method of preparing a high strength calcined gypsum, which consists in introducing lumps of gypsum having a diameter of ⅛" to 2" into a closed, externally heated container, for a period of 2½–5 hours, agitating said gypsum, removing steam produced by the water of crystallization in said gypsum so as to maintain a substantially uniform pressure in said container between 17 to 50 pounds per sq. in. gauge, removing the calcined gypsum from said container, and grinding the resulting lump, calcined gypsum so that 88–100% passes through a 100 mesh screen, to produce calcined gypsum having a compressive strength of 3500 to 5000 pounds per square inch when set with water at pouring consistency.

2. The method of calcining gypsum rock, which consists in introducing lumps of gypsum rock having diameters of ⅛" to 2" into a confined space, introducing steam into said space to raise the temperature of the rock to calcination point, applying heat externally to said space and gypsum rock to accomplish the calcination of said gypsum, agitating the gypsum rock in said space during calcination, continuously withdrawing steam from said space during calcination for a period of 2½–5 hours to maintain a substantially uniform calcination pressure in said space between 17 to 50 pounds per sq. in. gauge, controlling the application of external heat to produce a final temperature of 330–350° F. of said gypsum, removing the hot, dry, calcined gypsum from said space, cooling said calcined gypsum while exposed to the atmosphere to approximately room temperature and grinding said calcined gypsum so that 88–100% of same passes through a 100 mesh screen.

3. The method of preparing a high strength calcined gypsum which comprises heating lump gypsum rock having a diameter of ⅛" to 2" in a closed space by the application of external heat, agitating the gypsum during the calcination, continuously withdrawing steam from said space during calcination to maintain a substantially uniform steam pressure in said space between 17 to 50 pounds per sq. in. gauge, for a period of 2½–5 hours, removing the dry, lump calcined gypsum from said container, and grinding said calcined gypsum to form a high strength, powdered, calcined gypsum.

WILBUR S. RANDEL.
MANVEL C. DAILEY.